(12) United States Patent
Aquino (10) Patent No.: US 8,887,705 B2
(45) Date of Patent: Nov. 18, 2014

(54) HEAD COVER BAFFLE SYSTEM FOR IMPROVING OIL MIST SEPARATION

(75) Inventor: Phillip Aquino, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 13/478,934

(22) Filed: May 23, 2012

(65) Prior Publication Data

US 2013/0312720 A1    Nov. 28, 2013

(51) Int. Cl.
F02B 25/06 (2006.01)

(52) U.S. Cl.
USPC ............................................. 123/572

(58) Field of Classification Search
USPC .......................... 123/572–574, 41.86
IPC ...................... F01M 13/0416,13/022
See application file for complete search history.

(56) References Cited

U.S. PATENT DOCUMENTS

| | | | |
|---|---|---|---|
| 4,565,164 A | 1/1986 | Satoh et al. | |
| 5,617,834 A | 4/1997 | Lohr | |
| 5,944,001 A | 8/1999 | Hutchins | |
| 6,412,478 B1 | 7/2002 | Ruchlow et al. | |
| 6,530,367 B2 | 3/2003 | Akiwa et al. | |
| 6,811,586 B2 | 11/2004 | Stegmaier et al. | |
| 6,837,914 B2 | 1/2005 | Back | |
| 7,117,858 B2 | 10/2006 | Nonaka et al. | |
| 7,166,140 B2 | 1/2007 | Entezarian et al. | |
| 7,243,642 B2 | 7/2007 | Nishikawa et al. | |
| 7,556,029 B2 | 7/2009 | Naito et al. | |
| 7,568,475 B2 | 8/2009 | Lemke | |
| 7,594,501 B2 | 9/2009 | Brand et al. | |
| 7,647,906 B2 | 1/2010 | Takada et al. | |
| 7,740,677 B2 | 6/2010 | Knittel et al. | |
| 7,743,742 B2 | 6/2010 | Wagner et al. | |
| 7,785,401 B2 | 8/2010 | Wagner et al. | |
| 7,842,115 B2 | 11/2010 | Brand et al. | |
| 7,918,196 B2 | 4/2011 | Ishizaka et al. | |
| 7,938,875 B2 | 5/2011 | Son et al. | |
| 7,942,122 B2 | 5/2011 | Shieh et al. | |
| 8,065,993 B2 | 11/2011 | Festag et al. | |
| 2002/0078936 A1* | 6/2002 | Shureb | 123/572 |
| 2002/0112710 A1 | 8/2002 | Akiwa et al. | |
| 2003/0070982 A1 | 4/2003 | Baek | |
| 2003/0150436 A1* | 8/2003 | Stegmaier et al. | 123/572 |

(Continued)

OTHER PUBLICATIONS

International Search Report and Written Opinion of PCT/US2013/038632 dated Aug. 15, 2013.

*Primary Examiner* — M. McMahon
(74) *Attorney, Agent, or Firm* — Rankin, Hill & Clark LLP (57) ABSTRACT

An engine gas-oil separator for separating oil contents in blow-by gases that are recirculated into an intake system includes a head cover, a lower plate, and a plurality of baffles. The lower plate attaches to the head cover to define a separation chamber between an upper internal surface of the head cover and a lower internal surface of the lower plate. The separation chamber includes a blow-by gas inlet, a blow-by gas outlet and at least one oil outlet. The plurality of baffles are disposed in the separation chamber between the head cover and the lower plate. The plurality of baffles, the upper internal surface and the lower internal surface define a swirling flow path through the separation chamber in a longitudinal direction between the blow-by gas inlet and the blow-by gas outlet. The plurality of baffles are also configured to direct the blow-by gases in a generally transverse direction.

19 Claims, 10 Drawing Sheets

(56) References Cited

U.S. PATENT DOCUMENTS

2005/0092267 A1* 5/2005 Nonaka et al. ............. 123/41.86
2008/0127953 A1* 6/2008 Shieh et al. ................... 123/573
2010/0147273 A1* 6/2010 Akiyama et al. .............. 123/572
2013/0112179 A1* 5/2013 Spix et al. ..................... 123/573

* cited by examiner

HEAD COVER BAFFLE SYSTEM FOR IMPROVING OIL MIST SEPARATION

BACKGROUND

This disclosure relates to an engine gas-oil separator provided in a head cover for separating oil contents in blow-by gases that are recirculated to an air intake system of a normally aspirated engine.

Many gas-oil separation devices exist for separating oil mist from crank case gases. The crank case gases are recirculated back to an intake manifold of the engine for improved emissions. The gas-oil separation typically occurs between the intake manifold, which is usually under negative pressure, and the crank case, which is usually near atmospheric pressure. In a naturally aspirated engine, the crank case maintains near-atmospheric pressure condition because fresh air is supplied from outside the engine, usually through an air intake tube. The fresh air mixes with combustion gases that have leaked past the piston rings (hereinafter referred to as blow-by gases). The resulting mixture is drawn through a positive crank case ventilation (PCV) chamber where oil mist is separated from the blow-by gases. Ideally, the separated oil drains back to an oil sump while the blow-by gases are drawn into the intake manifold.

Many devices exist for separating oil from blow-by gases in the PCV chamber, such as foam blocks, rotating elements built into cam shafts, or complex systems of baffles. Problems arise, however, when the crank case pressure is greater than the PCV chamber intake flow pressure such as during high load conditions. Blow-by gases can be forced out of the crank case backwards through the path in which fresh air typically enters into the PCV chamber. This situation can be described as back-flow, where the excessive blow-by gases that are not drawn in by the PCV chamber are blown back through the fresh air intake path. This back-flow condition can carry oil entrained in the blow-by gases, and this oil can collect in the intake manifold, which can then negatively impact combustion, emissions and marketability.

SUMMARY

An example of an engine gas-oil separator for separating oil contents in blow-by gas that can overcome at least one of the aforementioned shortcomings includes a head cover, a lower plate attached to the head cover to define a separation chamber, a plurality of upper baffles disposed in the separation chamber, and a plurality of lower baffles disposed in a separation chamber. The lower plate attaches to the head cover to define the separation chamber between an upper internal surface of the head cover and a lower internal surface of the lower plate. The plurality of upper baffles depend downwardly from the upper internal surface of the head cover. The plurality of lower baffles extend upwardly from the lower internal surface of the lower plate. The plurality of upper baffles and the plurality of lower baffles are configured to impart a swirling flow of blow-by gases in a generally longitudinal direction through the separation chamber.

Another example of an engine gas-oil separator for separating oil contents in blow-by gases that are recirculated into an intake system includes a head cover, a lower plate, and a plurality of baffles. The lower plate attaches to the head cover to define a separation chamber between an upper internal surface of the head cover and a lower internal surface of the lower plate. The separation chamber includes a blow-by gas inlet, a blow-by gas outlet and at least one oil outlet. The plurality of baffles are disposed in the separation chamber between the head cover and the lower plate. The plurality of baffles, the upper internal surface and the lower internal surface define a swirling flow path through the separation chamber in a longitudinal direction between the blow-by gas inlet and the blow-by gas outlet. The plurality of baffles are also configured to direct the blow-by gases in a generally transverse direction. The plurality of baffles are further configured to reduce a cross-sectional area of the flow path adjacent where the blow-by gases change direction from the generally transverse direction to a generally downward direction.

Another example of an engine gas-oil separator for separating oil contents in blow-by gases that are recirculated to an intake system includes a head cover, a lower plate attached to the head cover to define a separation chamber, and a plurality of baffles disposed in the separation chamber. The lower plate attaches to the head cover to define the separation chamber between an upper internal surface of the head cover and a lower internal surface of the lower plate. The separation chamber includes a blow-by gas inlet, a blow-by gas outlet and at least one oil outlet. The plurality of baffles are disposed between the head cover and the lower plate. The plurality of baffles, the upper internal surface and the lower internal surface define a swirling flow path through the separation chamber in a longitudinal direction between the blow-by gas inlet and the blow-by gas outlet. The plurality of baffles are also configured to direct the blow-by gases in a generally transverse direction. The at least one oil outlet is disposed in the separation chamber generally longitudinally aligned with the gas inlet.

DETAILED DESCRIPTION

Figure 1:
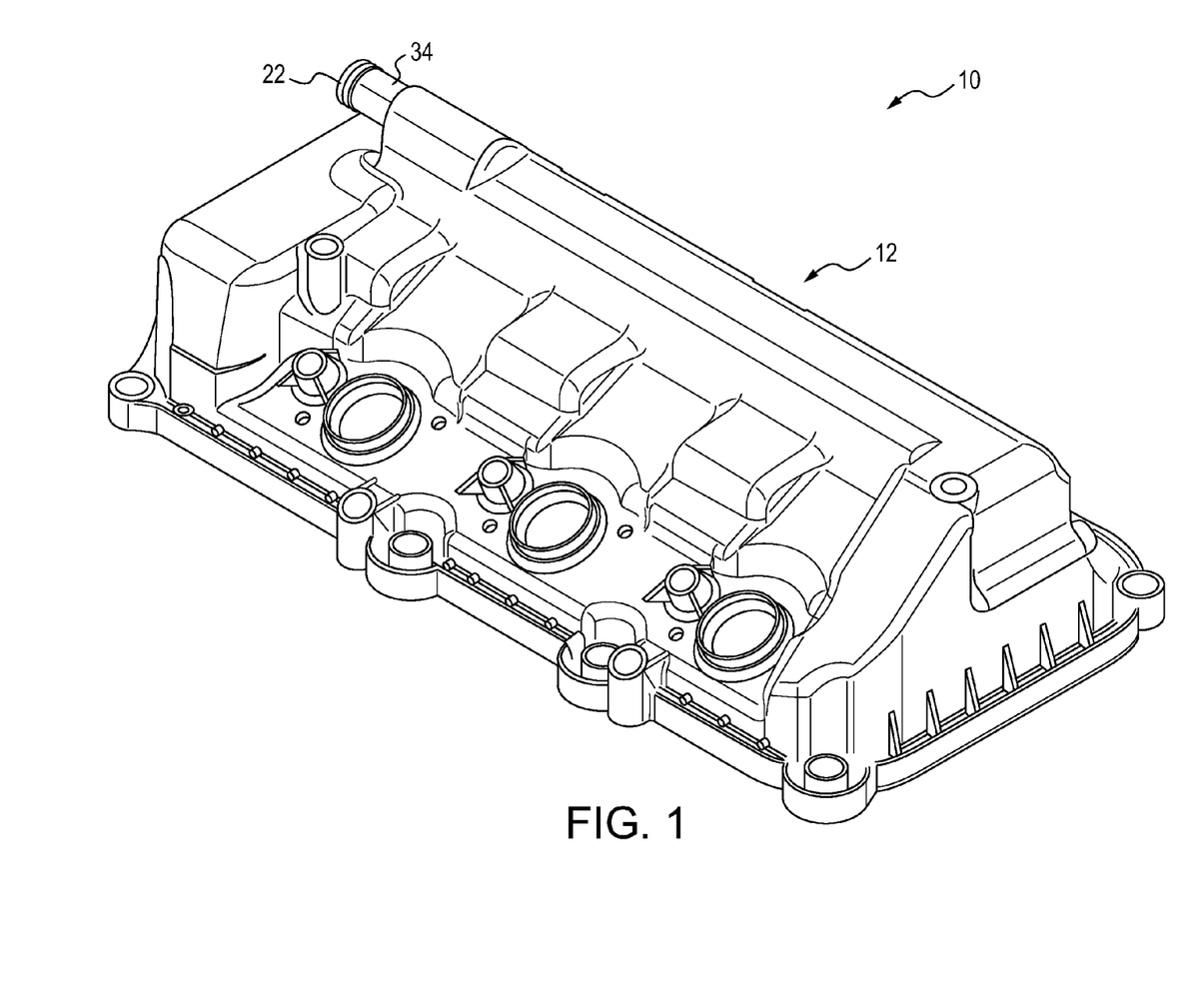
FIG. 1 is a perspective view of an upper side engine head cover.
Figure 2:
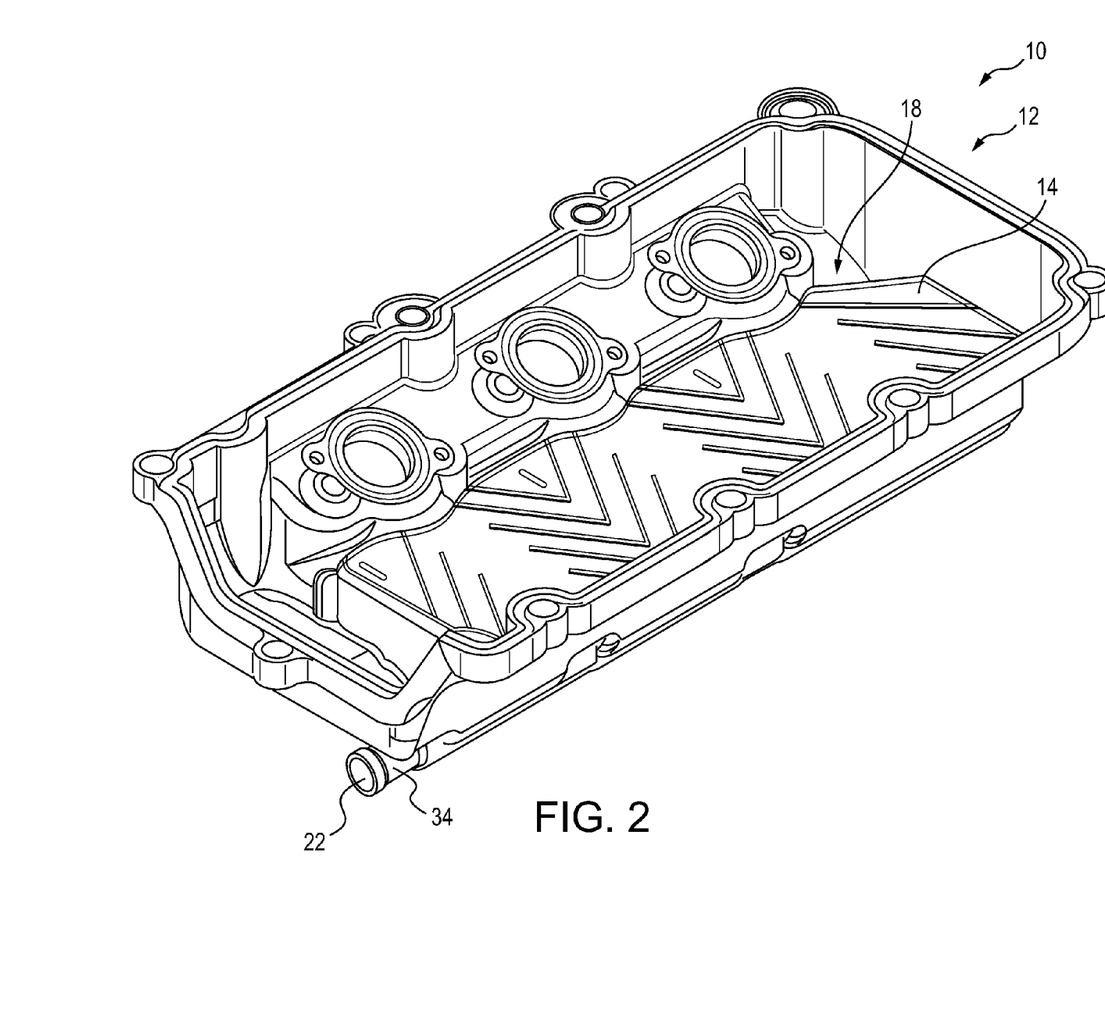
FIG. 2 is a perspective view of a lower side of the head cover shown in FIG. 1 having a bottom plate attached thereto to define a separation chamber for separating oil contents in blow-by gases that travel through the separation chamber.

FIGS. 1 and 2 depict an engine gas-oil separator 10 for separating oil contents in blow-by gases that are recirculated to an intake system of an engine (not shown) of a vehicle. The engine gas-oil separator (hereinafter also referred to as "separator") includes a head cover 12 and a lower plate 14 (shown in FIG. 2) attached to the head cover. The separator 10 depicted in FIGS. 1 and 2 is for one cylinder bank of a V-type six-cylinder engine. The head cover 12 is a casted or molded piece and can be made from plastic, as well as other materials.

Figure 3:
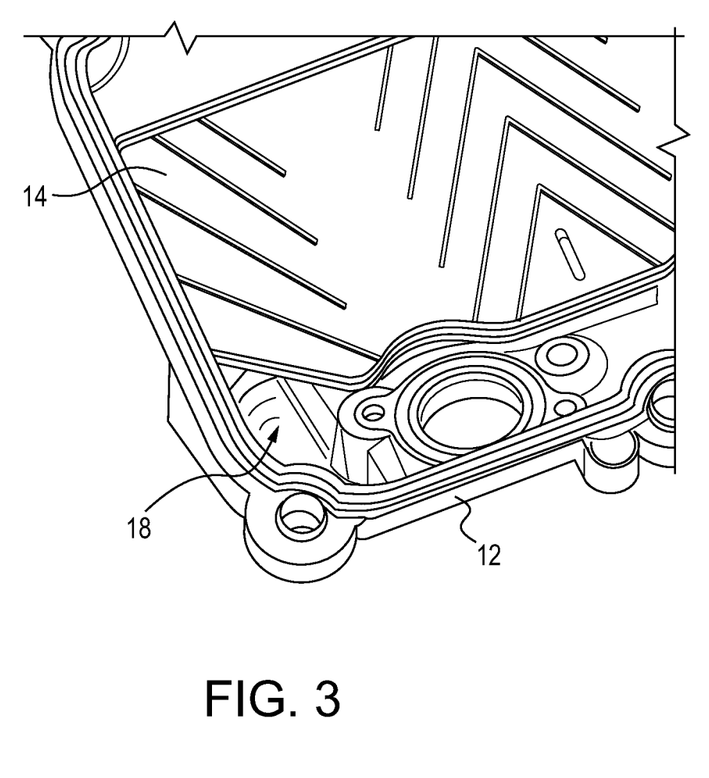
FIG. 3 is a perspective view from an opposite end to that shown in FIG. 2 of a portion of the head cover and bottom plate shown in FIG. 2.
Figure 4:
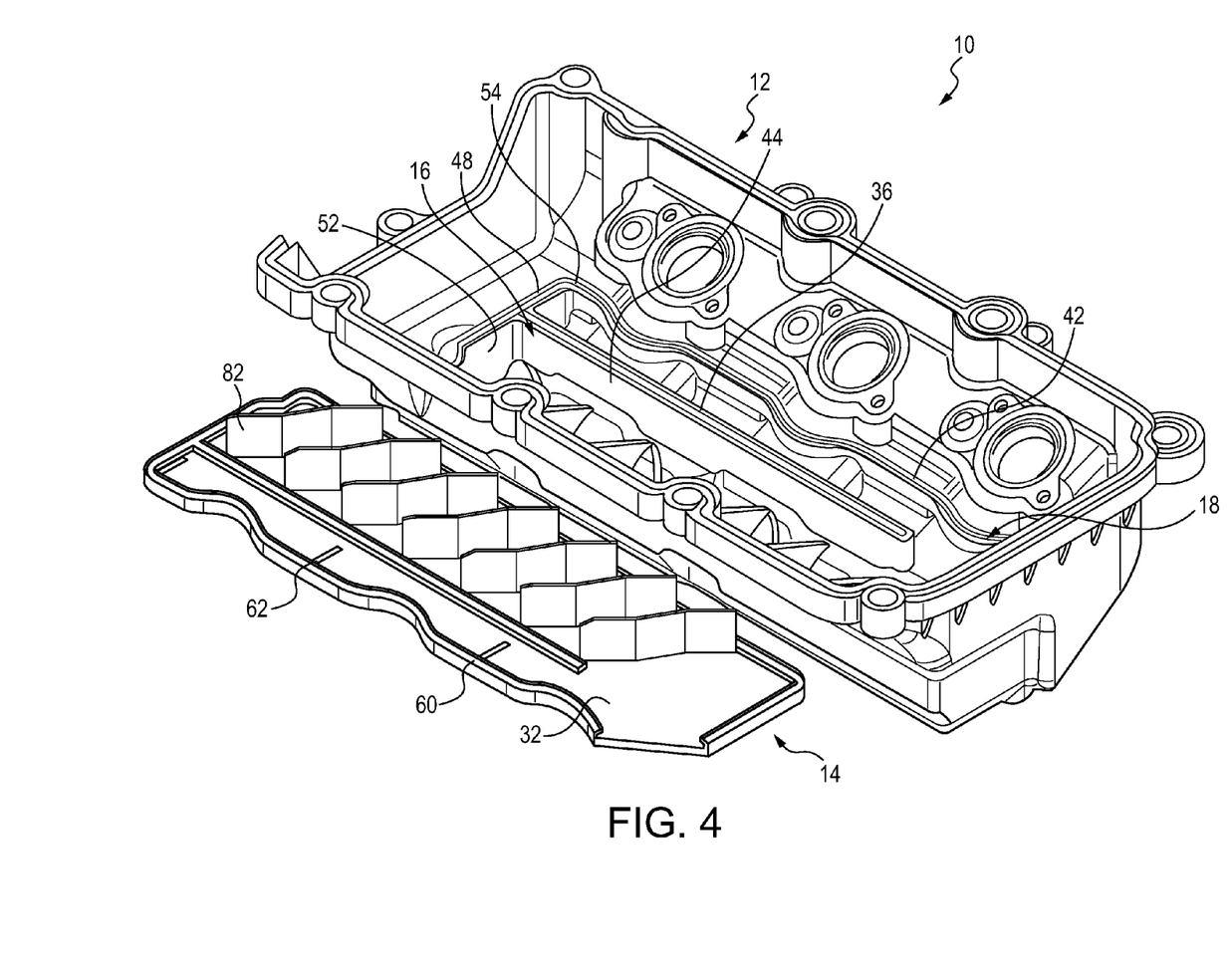
FIG. 4 is a perspective view from an opposite end shown to that shown in FIG. 2 of a lower side of the head cover shown in FIG. 1 having the bottom plate removed therefrom.
Figure 5A:
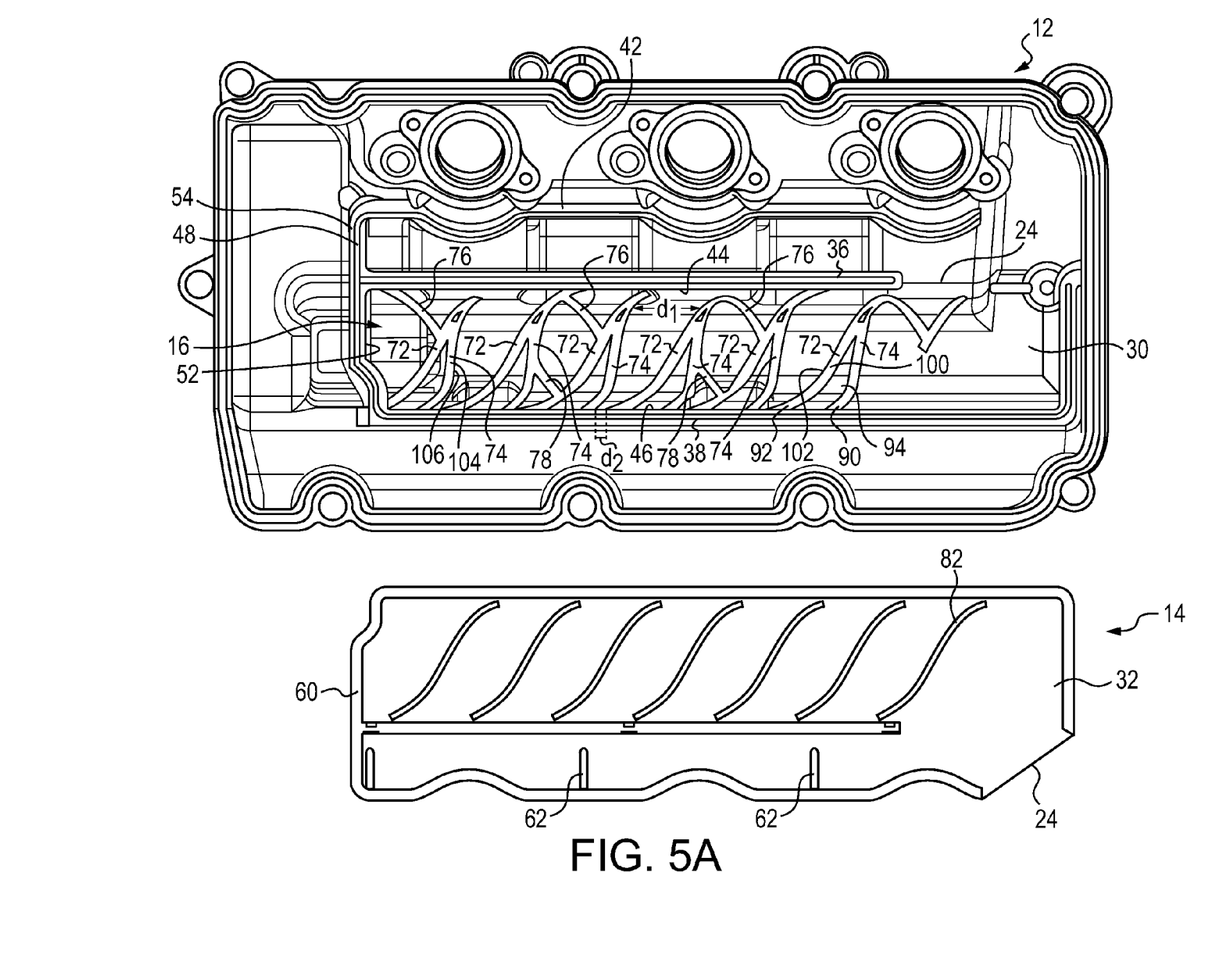
FIGS. 5A and 5B are each a plan views of the lower side of the head cover and an upper side of the lower plate.
Figure 5B:
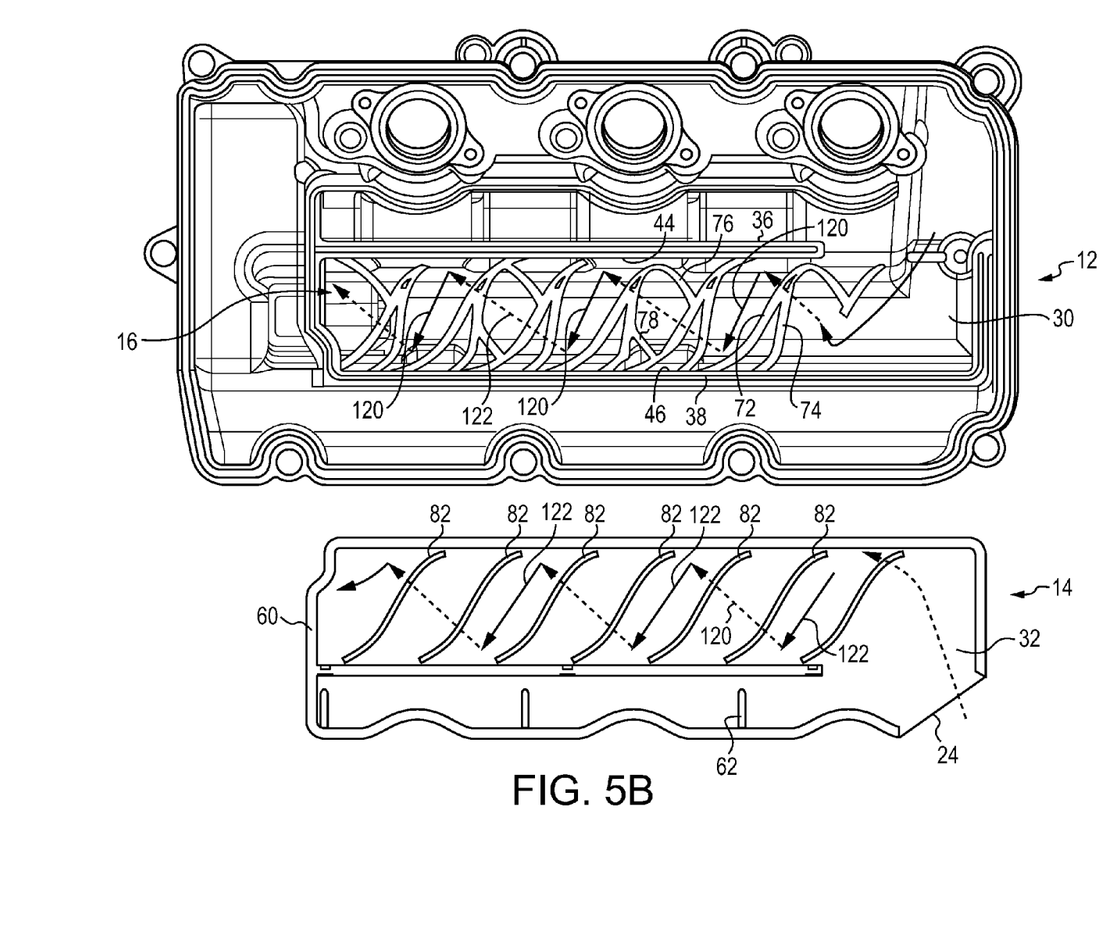

The lower plate 14 attaches to the head cover 12 to define a separation chamber 16 (FIG. 4) where oil contents in blow-by gases are separated. The separated oil drains back to an oil sump (not shown). The blow-by gases are drawn into an intake manifold (not shown) of the engine. The separation chamber 16 includes a blow-by gas inlet 18 (FIGS. 2 and 3), a blow-by gas outlet 22 (FIGS. 1 and 2) and at least one oil outlet 24 (FIGS. 5A and 5B). The lower plate 14 attaches to the head cover 12 to define the separation chamber 16 between an upper internal surface 30 (FIG. 5A) of the head cover 12 and a lower internal surface 32 (FIG. 5A) of the lower plate 14.

With reference back to FIG. 1, the head cover 12 includes a longitudinally extending tube 34. The tube 34 defines the blow-by gas outlet 22, which is in communication with the separation chamber 16. With reference to FIG. 5A, the head cover 12 includes a first longitudinal wall 36, a second longitudinal wall 38, and a third longitudinal wall 42. Each longitudinal wall 36, 38, 42 extends between the upper internal surface 30 and the lower internal surface 32. Each longitudinal wall 36, 38, 42 extends in a longitudinal direction of the head cover 12; the longitudinal direction being the direction in which the blow-by gases travel through the separation chamber 16 between the blow-by gas inlet 18 and the blow-by gas outlet 22.

The first longitudinal wall 36 defines a longitudinal first inner surface 44, which further defines the separation chamber 16. The longitudinal first inner surface 44 is generally planar in the illustrated embodiment. The second longitudinal wall 38 is spaced transversely (perpendicular to the longitudinal direction) from the first longitudinal wall 36. The second longitudinal wall 38 defines a longitudinal second inner surface 46, which further defines the separation chamber 16. The longitudinal second inner surface 46 is also generally planar in the illustrated embodiment. The third longitudinal wall 42 is spaced transversely from the first longitudinal wall 36 in a transverse direction opposite the direction in which the second longitudinal wall 38 is spaced from the first longitudinal wall 36. The head cover 12 also includes a transverse end wall 48 interconnecting the first longitudinal wall 36, the second longitudinal wall 38, and the third longitudinal wall 42. The transverse end wall 48 defines a transverse inner surface 52, which further defines the separation chamber 16. The transverse inner surface 52 is also generally planar in the illustrated embodiment.

The first longitudinal wall 36, the second longitudinal wall 38, the third longitudinal wall 42, and the transverse end wall 48 are all interconnected forming a common lower edge, which defines a seat 54. The seat 54 in combination with a gasket (not shown) allows the lower plate 14 to seal against the head cover 12 to define the separation chamber 16. The first longitudinal wall 36, the second longitudinal wall 38, the third longitudinal wall 42, and the transverse end wall 48 can be integrally formed with the head cover 12 during the casting or molding of the head cover.

As mentioned above, the lower plate 14 attaches to the head cover 12 to define the separation chamber 16. The lower internal surface 32 in the depicted embodiment is generally planar. The upper internal surface 30 is generally arc-shaped in a cross-section taken normal to the longitudinal direction (see FIG. 7). With reference back to FIG. 5A, the lower plate 14 further includes a continuous ridge 60 that extends upwardly from the lower internal surface 32. The continuous ridge 60 matches the configuration of the seat 54 formed in the head cover 12. The ridge 60 in combination with the gasket (not shown) and the seat 54 seals off the separation chamber 16 between the blow-by gas inlet 18 and the blow-by gas outlet 22. The lower plate 14 also includes openings 62 through which oil separated from the blow-by gases can flow into an oil sump (not shown).

The engine gas-oil separator 10 further includes a plurality of baffles 72, 74, 76, 78, 82 disposed in the separation chamber 16 between the head cover 12 and the lower plate 14. The plurality of baffles 72, 74, 76, 78, 82, the upper internal surface 30 and the lower internal surface 32 define a swirling flow path (see FIGS. 5B, 6B and 7) through the separation chamber 16 in the longitudinal direction between the blow-by gas inlet 18 and the blow-by gas outlet 22.

In the illustrated embodiment, the plurality of baffles 72, 74, 76, 78, 82 includes a plurality of upper baffles 72, 74, 76 and 78. With reference to FIG. 5B, the plurality of upper baffles 72, 74, 76 and 78 are disposed in the separation chamber 16 and depend downwardly from the upper internal surface 30 of the head cover 12. The plurality of upper baffles 72, 74, 76 and 78 can be integrally formed with the head cover 12 during the casting or molding of the head cover. Each upper baffle 72, 74, 76 and 78 depends downwardly from the upper internal surface 30 to generally midway between the upper internal surface 30 and the lower internal surface 32 in a direction perpendicular to both the transverse direction and longitudinal direction.

The plurality of upper baffles 72, 74, 76 and 78 includes a plurality of first upper baffles 72 and a plurality of second upper baffles 74. As seen in FIG. 5A, adjacent the first longitudinal wall 36 each first upper baffle 72 is spaced a longitudinal distance $d_1$ from an adjacent downstream second upper baffle 74. Adjacent the second longitudinal wall 38, however, each first upper baffle 72 is spaced a longitudinal distance $d_2$ from an adjacent downstream second upper baffle 74. In the illustrated embodiment, $d_2$ is less than $d_1$, which reduces the cross-sectional area of the flow path and increases the velocity of the swirling airflow. This encourages entrained oil droplets in the swirling airflow to drop out of the airflow and onto the lower internal surface 32 defined the by the lower plate 14.

With continued reference to FIG. 5A, each first upper baffle 72 and each second upper baffle 74 extends in a generally transverse direction through the separation chamber 16. In the illustrated embodiment, each second upper baffle 74 extends in a generally transverse direction from a respective first upper baffle 72 toward the second longitudinal wall 38. A terminal edge 90 of each second upper baffle 74 adjacent the second longitudinal wall 38 is longitudinally spaced from an end 92 of the first upper baffle 72 from which the respective second upper baffle 74 extends. As such, a respective void 94 is provided between the respective second upper baffle 74 and the first upper baffle 72 from which the respective second upper baffle extends. The void 94 is disposed downstream from the respective second upper baffle 74 and upstream from the first upper baffle 72 from which the respective second upper baffle extends.

Each first upper baffle 72 includes a central section 100, which is centrally located in the transverse direction between the first longitudinal wall 36 and the second longitudinal wall 38. The central section 100 defines a generally planar trailing baffle surface 102. Each second upper baffle 74 includes a central portion 104, which is also centrally located in the transverse direction between the first longitudinal wall 36 and the second longitudinal wall 38. The central portion 104 defines a generally planar leading baffle surface 106. The blow-by gases travel between the trailing baffle surfaces 102 and the leading baffle surfaces 106 when traveling through the separation chamber 16 (see FIG. 5B). As illustrated, each leading baffle surface 106 is oriented more closely to perpendicular with respect to the longitudinal direction as compared to each trailing baffle surface 102. This results in a reduction of a cross-sectional area of the flow path through the separation chamber adjacent the second longitudinal wall 38.

The plurality of upper baffles 72, 74, 76 and 78 further includes a plurality of upper cross baffles 76, 78 interconnecting a respective second upper baffle 74 to an adjacent first upper baffle 72 upstream from the respective second upper baffle 74. The plurality of upper cross baffles 76 and 78 includes a plurality of longer cross baffles 76 and a plurality of shorter cross baffles 78. The longer cross baffles 76 are disposed closer to the first longitudinal wall 36. The shorter cross baffles 78 are disposed closer to the second longitudinal wall 38. The cross baffles 76 and 78 are configured to preclude airflow between respective first upper baffles 72 and respective second upper baffles 74 interconnected by the cross baffles 76, 78 as the airflow travels between respective lower baffles 82 through the separation chamber 16.

The plurality of first upper baffles 72 each has a generally S-shaped configuration in plan view (normal to both the longitudinal direction and the transverse direction). Each of the second upper baffles 74 also has a generally S-shaped configuration in plan view (see FIG. 5A). The plurality of lower baffles 74, however, each have a generally backwards S-shaped configuration in plan view. The lower baffles 82 depicted in FIG. 5A are generally S-shaped; however, when the lower plate 14 is connected to the head cover 12, the orientation is a mirror image of that shown in FIG. 5. When viewed, normal to the longitudinal direction, each first upper baffle 72 terminates adjacent or crosses over a respective lower baffle 82 adjacent the first longitudinal wall 36. Also, when viewed normal to the longitudinal direction, each first upper baffle 72 terminates adjacent or crosses over a respective lower baffle 82 adjacent the second longitudinal wall 38.

With reference back to FIG. 5A, the plurality of lower baffles 82 are disposed in the separation chamber 16 and extend upwardly from the lower internal surface 32 of the lower plate 14. The plurality of upper baffles 72, 74, 76 and 78 and the plurality of lower baffles 82 are configured to impart a swirling flow of blow-by gases in the generally longitudinal direction through the separation chamber 16. Each lower baffle 82 extends about midway between the lower internal surface 32 and the upper internal surface 30 in a direction perpendicular to both the transverse and longitudinal directions. The plurality of lower baffles 82 are configured to direct the blow-by gases in a generally transverse direction.

FIG. 5B schematically depicts the swirling flow of blow-by gases through the separation chamber. Arrows with solid lines depict the blow-by gases traveling between adjacent baffles shown in that particular view. Arrows with dashed lines depict the blow-by gases traveling between baffles shown in the other view. Arrows 120 depict gases flowing between adjacent upper baffles 72 and 74 and arrows 122 depict gases flowing between adjacent lower baffles 82.

As discussed above, each upper baffle 72, 74, 76 and 78 depends downwardly from the upper internal surface 30 to generally midway between the upper internal surface 30 and the lower internal surface 32 in a direction perpendicular to both the transverse direction and longitudinal direction. Also, each lower baffle 82 extends about midway between the lower internal surface 32 and the upper internal surface 30 in a direction perpendicular to both the transverse and longitudinal directions. Due to this construction, the plurality of upper baffles 72, 74, 76 and 78 and the plurality of lower baffles 82 are configured such that the blow-by gases travel in a swirling flow defined by a generally upward flow adjacent the first longitudinal wall 36, then a first generally transverse flow (depicted by solid arrows 120 in FIG. 5) between adjacent upper baffles 72 and 74 generally toward the second longitudinal wall 38, then a generally downwardly flow adjacent the second longitudinal wall 38, and then a second generally transverse flow (depicted by solid arrows 122 in FIG. 5) between adjacent lower baffles 82 toward the first longitudinal wall 36. The upper cross baffles 76, 78 inhibit flow between the first upper baffles 72 and the second upper baffles 74 connected by the cross baffles 76, 78, thus directing the flow between respective lower baffles 82 in this region of the separation chamber. This results in the desirable swirling airflow between the blow-by gas inlet 18 and the blow-by gas outlet 22 in the generally longitudinal direction.

Figure 6A:
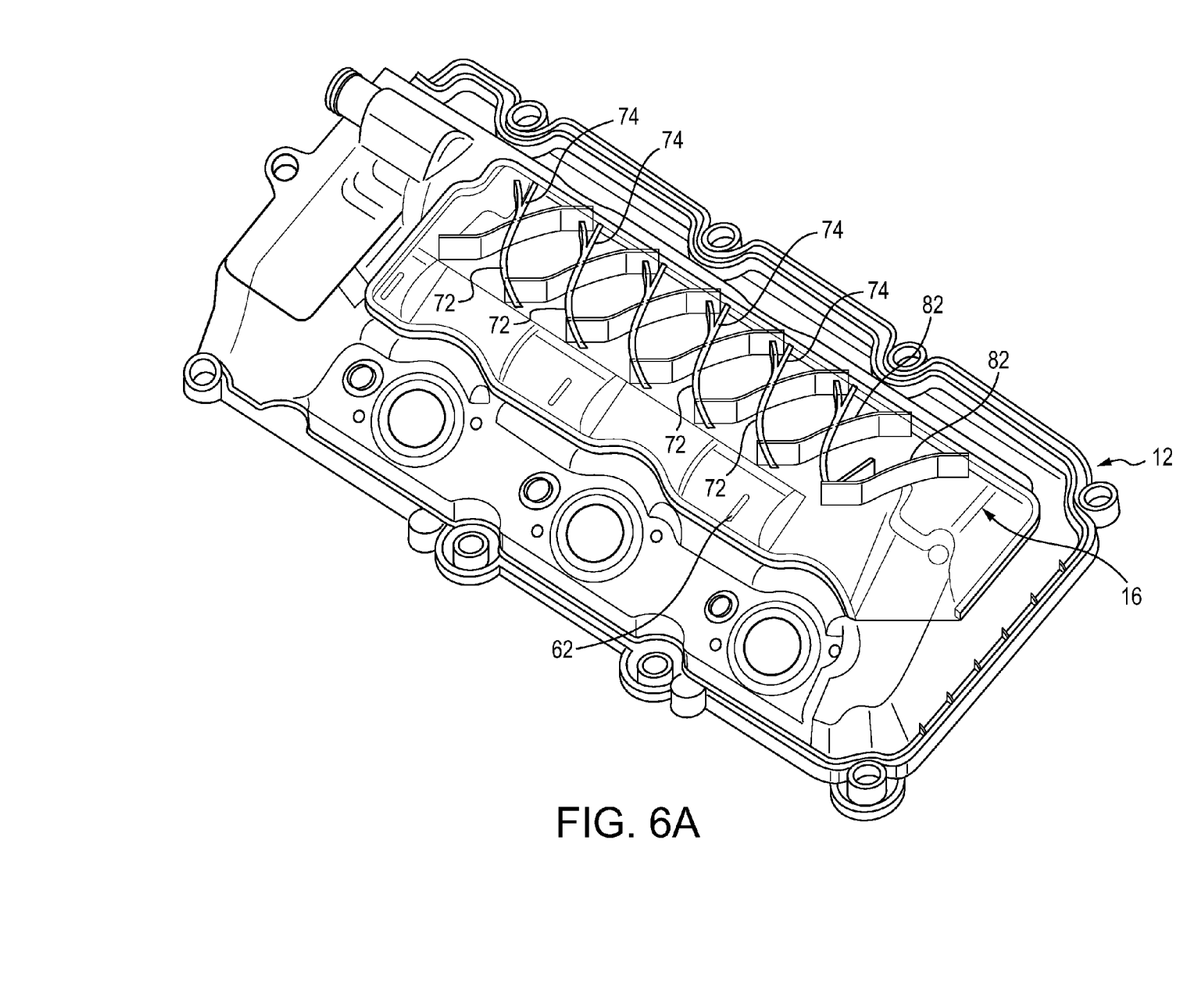
FIGS. 6A and 6B are each a perspective view similar to FIG. 1 with a section of the head cover shown as transparent to provide a view of baffles disposed in the separation chamber.
Figure 6B:
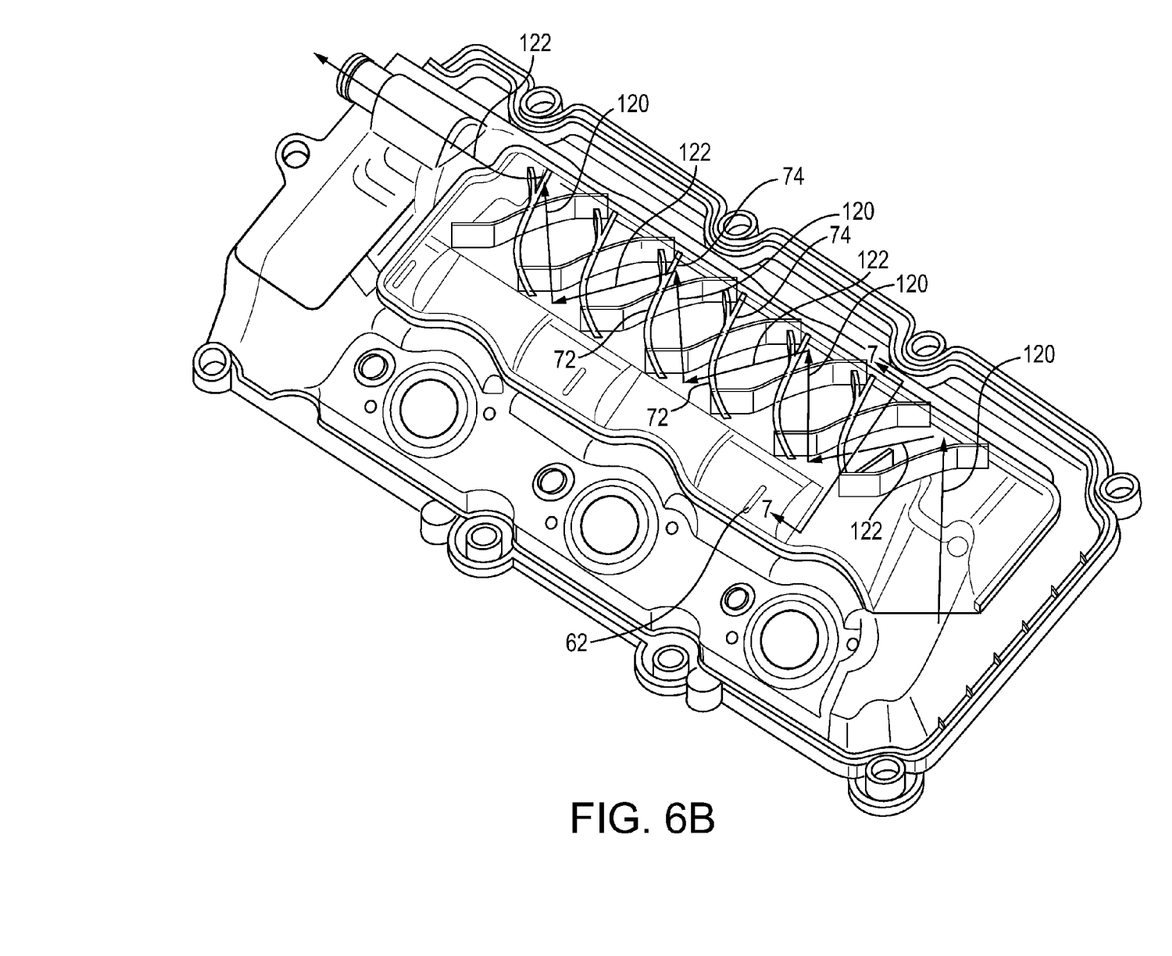
Figure 7:
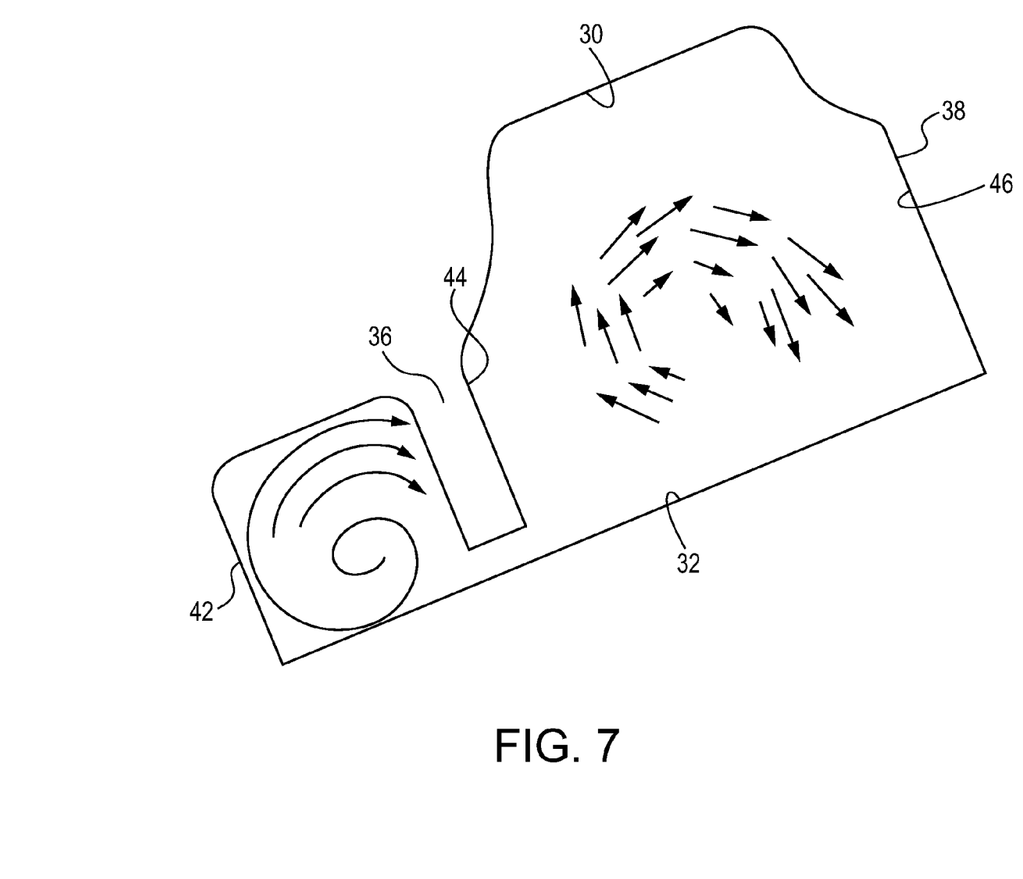
FIG. 7 schematically depicts a swirling flow of blow-by gases through the separation chamber along line 7-7 of FIG. 6B.

FIG. 6B also discloses the swirling flow of blow-by gas through the separation chamber 16. Arrows 120 depict airflow between adjacent upper baffles 72 and 74 and arrows 122 depict airflow between adjacent lower baffles 82. FIG. 7 depicts the swirling airflow of the blow-by gases as depicted along lines 7-7 in FIG. 6B. Arrows having longer tails and larger heads depict a greater velocity than arrows with smaller heads and shorter tails in FIG. 7. The plurality of upper baffles 72, 74, 76 and 78 and the plurality of lower baffles 82 are configured such that the blow-by gases travel in a swirling flow in a manner such that a greatest velocity of the swirling flow results during the generally downward flow adjacent the second longitudinal wall 38, which is schematically depicted in FIG. 7. The reduction in the cross-sectional area of the flow path induces the increased velocity adjacent the second longitudinal wall 38. The reduction in the cross-sectional area due to the curvature and shape of the upper baffles 72 and 74 allows for the greatest velocity of the swirling flow to result during the generally downward flow adjacent to second longitudinal wall 38. Oil mist entrained in the blow-by gases is directed toward the second longitudinal wall 38 due to the configuration of the upper baffles 72, 74, 76 and 78. Due to the centrifugal force and the oil droplets contacting the second longitudinal wall 38, the entrained oil drops out of the swirling flow of the blow-by gases. The oil that has been separated from the airflow can travel along the lower surface 32 of the separation chamber 16 toward the oil outlet 24. The flow between the lower baffles 82, which generally directs swirling airflow from the second longitudinal wall 38 toward the first longitudinal wall 36, can further direct the oil droplets that have fallen out of the swirling airflow toward the oil outlet 24. The oil separator 10 can also be mounted on the engine in a canted configuration, such as that shown in FIG. 7, so that gravity can also direct the separated oil droplets toward the oil outlet 24. The oil outlet 24 can be disposed in the separation chamber 16 generally aligned with gas inlet 18.

Figure 8:
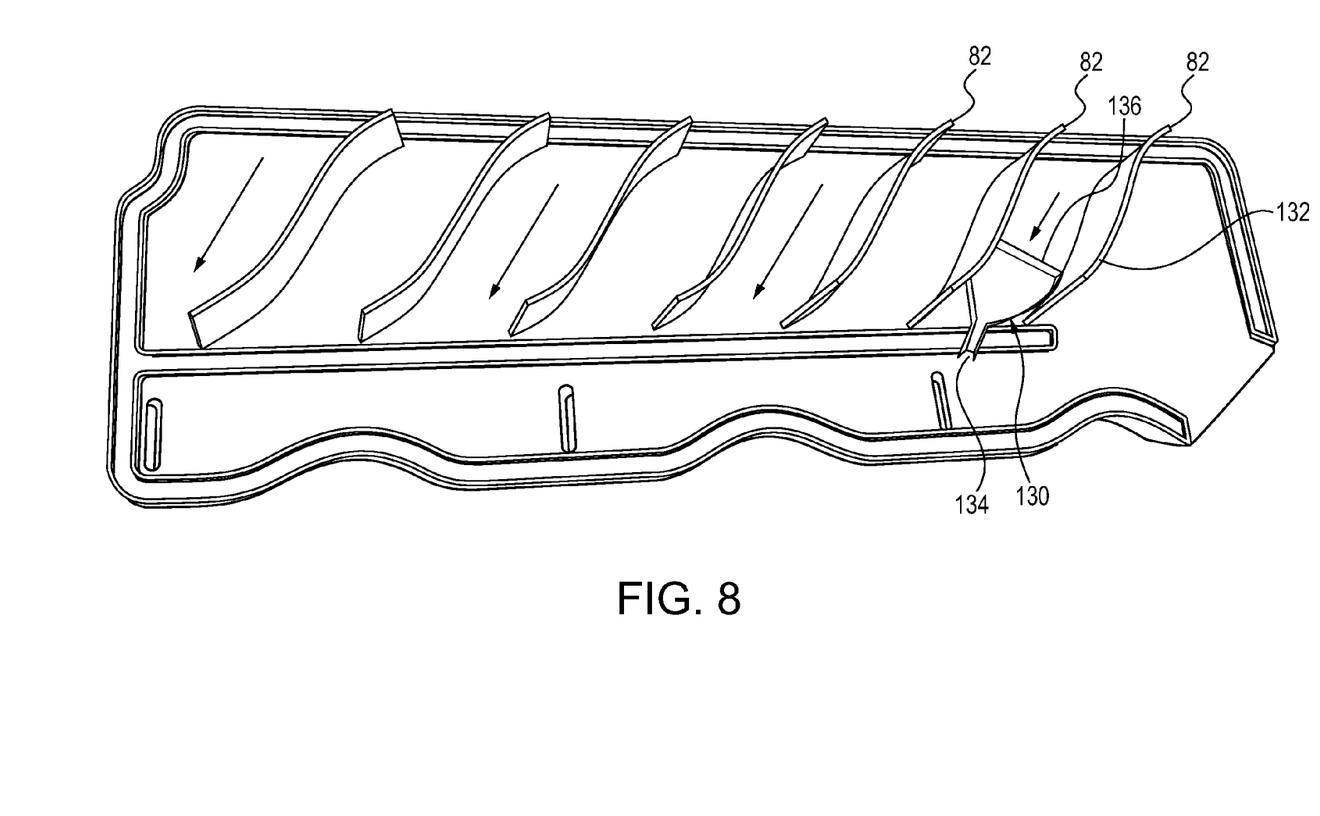
FIG. 8 is a top view of an alternative arrangement of a bottom plate of an engine gas-oil separator including a funnel for collecting separated oil from the blow-by gases.

With reference to FIG. 8, the engine gas-oil separator can further include a funnel 130 for collecting oil separated from the blow-by gases. With reference to FIG. 8, the funnel 130 includes an upper wall 132 spaced from the lower surface 32 of the separation chamber 16. The funnel 130 is positioned in the separation chamber 16 adjacent the first longitudinal wall 36 and between adjacent lower baffles 82 that direct blow-by gases toward the first longitudinal wall 36. For example, a plurality of funnels could be provided between adjacent lower baffles 82 that have a solid arrow 122 disposed therebetween in FIG. 5B. The upper wall 32 spans between adjacent lower baffles 82 that direct airflow transversely toward the funnel 130 (and thus transversely toward the first longitudinal wall 36). Each funnel 130 includes a pipe 134 that extends through the first longitudinal wall 36. This pipe 134 can also define the oil outlet 24 for the separation chamber 16. A leading edge 136, which can define an inlet of the funnel 130, can be located transversely spaced from the first longitudinal wall 36 toward the second longitudinal wall 38 and adjacent where the generally transverse flow parallel with the lower surface 32 transitions toward a generally upward flow adjacent the first longitudinal wall 36.

An engine gas-oil separator has been described above with particularity. Modifications and alterations will occur to those upon reading and understanding the preceding detailed description. The invention, however, is now limited to only the embodiments described above. Instead, the invention is broadly defined by the appended claims and the equivalents thereof.

The invention claimed is:

1. An engine gas-oil separator for separating oil contents in blow-by gases that are recirculated to an intake system, the separator comprising:
   a head cover;
   a lower plate attached to the head cover to define a separation chamber between an upper internal surface of the head cover and a lower internal surface of the lower plate;
   a plurality of upper baffles disposed in the separation chamber and depending downwardly from the upper internal surface of the head cover;
   a plurality of lower baffles disposed in the separation chamber and extending upwardly from the lower internal surface of the lower plate, wherein the plurality of upper baffles and the plurality of lower baffles are configured to impart a swirling flow of blow-by gases in a generally longitudinal direction through the separation chamber;
   a first longitudinal wall extending between the upper internal surface and the lower internal surface, the first longitudinal wall defining a longitudinal first inner surface, which further defines the separation chamber; and
   a second longitudinal wall extending between the upper internal surface and the lower internal surface and spaced from the first longitudinal wall, the second longitudinal wall defining a longitudinal second inner surface, which further defines the separation chamber,
   wherein the plurality of upper baffles includes a plurality of first upper baffles and a plurality of second upper baffles,
   wherein adjacent the first longitudinal wall each first upper baffle is spaced a longitudinal distance $d_1$ from an adjacent downstream second upper baffle,
   wherein adjacent the second longitudinal wall each first upper baffle is spaced a longitudinal distance $d_2$ from an adjacent downstream second upper baffle, wherein $d_2$ is less than $d_1$.

2. The separator of claim 1, wherein each second upper baffle extends in a generally transverse direction from a respective first upper baffle toward the second longitudinal wall, wherein a terminal edge of each second upper baffle adjacent the second longitudinal wall is longitudinally spaced from an end of the first upper baffle from which the respective second upper baffle extends and a respective void is provided between the respective second upper baffle and the first upper baffle from which the respective second upper baffle extends.

3. The separator of claim 1, wherein each first upper baffle includes a central section defining a generally planar trailing baffle surface and each second upper baffle includes a central portion defining a generally planar leading baffle surface, wherein the blow-by gases travel between the trailing baffle surface and the leading baffle surface and the leading baffle surface is oriented more closely to perpendicular with respect to the longitudinal direction as compared to the trailing baffle surface.

4. The separator of claim 1, wherein the plurality of upper baffles includes a plurality of upper cross baffles interconnecting a respective second upper baffle to an adjacent first upper baffle upstream from the respective second upper baffle.

5. An engine gas-oil separator for separating oil contents in blow-by gases that are recirculated to an intake system, the separator comprising:
   a head cover;
   a lower plate attached to the head cover to define a separation chamber between an upper internal surface of the head cover and a lower internal surface of the lower plate;
   a plurality of upper baffles disposed in the separation chamber and depending downwardly from the upper internal surface of the head cover; and
   a plurality of lower baffles disposed in the separation chamber and extending upwardly from the lower internal surface of the lower plate, wherein the plurality of upper baffles and the plurality of lower baffles are configured to impart a swirling flow of blow-by gases in a generally longitudinal direction through the separation chamber, wherein the plurality of upper baffles includes a plurality of first upper baffles each having a generally S-shaped configuration and the plurality of lower baffles each have a generally backwards S-shaped configuration.

6. The separator of claim 5, further comprising:
   a first longitudinal wall extending between the upper internal surface and the lower internal surface;
   a second longitudinal wall extending between the upper internal surface and the lower internal surface and spaced from the first longitudinal wall,
   wherein when viewed in a plane normal to the longitudinal direction each first upper baffle terminates adjacent or crosses over a respective lower baffle adjacent the first longitudinal wall.

7. The separator of claim 6, wherein when viewed normal to the longitudinal direction each first upper baffle terminates adjacent or crosses over a respective lower baffle adjacent the second longitudinal wall.

8. The separator of claim 5, further comprising a funnel for collecting oil separated from the blow-by gases.

9. The separator of claim 8, wherein the funnel includes an upper wall spaced from the lower internal surface toward the upper internal surface and spanning between adjacent lower baffles.

10. An engine gas-oil separator for separating oil contents in blow-by gases that are recirculated to an intake system, the separator comprising:
    a head cover;
    a lower plate attached to the head cover to define a separation chamber between an upper internal surface of the head cover and a lower internal surface of the lower plate, the separation chamber having a blow-by gas inlet, a blow-by gas outlet and at least one oil outlet; and
    a plurality of baffles disposed in the separation chamber between the head cover and the lower plate, wherein the plurality of baffles, the upper internal surface and the lower internal surface define a swirling flow path through the separation chamber in a longitudinal direction between the blow-by gas inlet and the blow-by gas outlet, wherein the plurality of baffles are also configured to direct the blow-by gases in a generally transverse direction, wherein the plurality of baffles are further configured to reduce a cross-sectional area of the flow path adjacent where the blow-by gases change direction from the generally transverse direction to a generally downward direction.

11. The separator of claim 10, wherein the plurality of baffles define a plurality of trailing baffle surfaces and a plurality of leading baffle surfaces, wherein the blow-by gasses travel in the generally transverse direction between each trailing baffle surface and a respective adjacent leading baffle surface while traveling through the separation chamber, wherein a longitudinal distance between each trailing baffle surface and the respective adjacent leading baffle surface decreases in the longitudinal direction.

12. The separator of claim 10, wherein the plurality of baffles includes a plurality of upper baffles disposed in the separation chamber and depending downwardly from the upper internal surface of the head cover and a plurality of lower baffles disposed in the separation chamber and extending upwardly from the lower internal surface of the lower plate.

13. The separator of claim 12, further comprising:
a first longitudinal wall extending between the head cover and the lower plate, the first longitudinal wall defining a longitudinal first inner surface, which further defines the separation chamber; and
a second longitudinal wall extending between the head cover and the lower plate and spaced transversely from the first longitudinal wall, the second longitudinal wall defining a longitudinal second inner surface, which further defines the separation chamber.

14. The separator of claim 13, wherein the plurality of upper baffles and the plurality of lower baffles are configured such that blow-by gases travel in the swirling flow defined by a generally upward flow adjacent the first longitudinal wall, then a first generally transverse flow between adjacent upper baffles generally toward the second longitudinal wall, then a generally downward flow adjacent the second longitudinal wall, and then a second generally transverse flow between adjacent lower baffles toward the first longitudinal wall.

15. The separator of claim 14, wherein the plurality of upper baffles and the plurality of lower baffles are configured such that blow-by gases travel in the swirling flow in a manner such that a greatest velocity of the swirling flow results during the generally downward flow adjacent the second longitudinal wall.

16. The separator of claim 13, further comprising a funnel for collecting oil separated from the blow-by gases, wherein the funnel includes a leading edge defining an inlet to the funnel, the leading edge being spaced transversely from the first longitudinal wall.

17. An engine gas-oil separator for separating oil contents in blow-by gases that are recirculated to an intake system, the separator comprising:
a head cover;
a lower plate attached to the head cover to define a separation chamber between an upper internal surface of the head cover and a lower internal surface of the lower plate, the separation chamber having a blow-by gas inlet, a blow-by gas outlet and at least one oil outlet; and
a plurality of upper baffles and a plurality of lower baffles disposed in the separation chamber between the head cover and the lower plate, wherein the plurality of upper baffles, the plurality of lower baffles, the upper internal surface and the lower internal surface define a swirling flow path through the separation chamber in a longitudinal direction between the blow-by gas inlet and the blow-by gas outlet, wherein the plurality of upper baffles and the plurality of lower baffles are configured such that blow-by gases travel in a swirling flow defined by a generally upward flow adjacent a first longitudinal wall of the separation chamber, then a first generally transverse flow between adjacent upper baffles generally toward a second longitudinal wall of the separation chamber, then a generally downward flow adjacent the second longitudinal wall, and then a second generally transverse flow between adjacent lower baffles toward the first longitudinal wall.

18. The separator of claim 17, wherein the plurality of upper baffles depend downwardly from the upper internal surface of head cover and the plurality of lower baffles extend upwardly from the lower internal surface of the lower plate.

19. The separator of claim 18, wherein the first longitudinal wall extends between the head cover and the lower plate, the first longitudinal wall defining a first inner surface, which further defines the separation chamber; and
the second longitudinal wall extends between the head cover and the lower plate and is spaced from the first longitudinal wall, the second longitudinal wall defining a second inner surface, which further defines the separation chamber, wherein the plurality of upper baffles and the plurality of lower baffles are configured such that blow-by gases travel in the swirling flow in a manner such that a greatest velocity of the swirling flow results during the generally downward flow adjacent the second longitudinal wall.

* * * * *